United States Patent
Sabatier et al.

(10) Patent No.: US 6,754,708 B1
(45) Date of Patent: Jun. 22, 2004

(54) PROCEDURE FOR ESTABLISHING COMMUNICATION BETWEEN TWO INFORMATION-TRANSMISSION DEVICES CONNECTED TO A COMPUTER NETWORK OF THE INTERNET TYPE, AND A SERVER FOR CONNECTING THE DEVICES

(75) Inventors: Pierre Sabatier, Cergy Saint Christophe (FR); Louis Bede Omgba, Jouy le Moutier (FR)

(73) Assignee: Sagem SA, Paris (FR)

( * ) Notice: Subject to any disclaimer, the term of this patent is extended or adjusted under 35 U.S.C. 154(b) by 0 days.

(21) Appl. No.: 09/488,765

(22) Filed: Jan. 21, 2000

(30) Foreign Application Priority Data

Jan. 22, 1999 (FR) .............................................. 99 00698

(51) Int. Cl.⁷ ............................................... G06F 13/00
(52) U.S. Cl. ....................... 709/227; 709/245; 709/237; 370/352
(58) Field of Search ................................ 709/227, 245, 709/229, 237; 370/352

(56) References Cited

U.S. PATENT DOCUMENTS

| | | | | |
|---|---|---|---|---|
| 6,026,087 A | * | 2/2000 | Mirashrafi et al. | .......... 370/389 |
| 6,377,570 B1 | * | 4/2002 | Vaziri et al. | ................. 370/352 |
| 6,542,472 B1 | * | 4/2003 | Onuma | ........................ 370/253 |
| 6,584,094 B2 | * | 6/2003 | Maroulis et al. | ............. 370/352 |
| 6,636,506 B1 | * | 10/2003 | Fan | .............................. 370/356 |
| 6,661,785 B1 | * | 12/2003 | Zhang et al. | ................ 370/352 |
| 6,671,272 B2 | * | 12/2003 | Vaziri et al. | ................. 370/352 |

FOREIGN PATENT DOCUMENTS

| | | |
|---|---|---|
| WO | 97 14234 | 4/1997 |
| WO | 98 37665 | 8/1998 |

* cited by examiner

Primary Examiner—Kenneth R. Coulter
(74) Attorney, Agent, or Firm—Quarles & Brady LLP

(57) ABSTRACT

In a process for establishing communication on the Internet between two devices (1,2) also connected to a telephone network (4), one device (1) calls the other (2) on the telephone network (4) to invite it into communication, transmitting to it an identification signal (N1; IP1) of the calling device (1), the called device (2) connects to the INTERNET (3) and receives an address (IP2), the called device (2) connects to an INTERNET connection server (5) where it registers itself by its address (IP2) and an identifier (N2, IP1) known to the calling device (1), and the calling device (1) connects to the server (5), transmits the identifier (N2, IP1) and the server (5) transmits the address (IP2) of the called device (2), and the calling device (1), knowing the computer address (IP2) of the called device (2), establishes the communication.

4 Claims, 1 Drawing Sheet

PROCEDURE FOR ESTABLISHING COMMUNICATION BETWEEN TWO INFORMATION-TRANSMISSION DEVICES CONNECTED TO A COMPUTER NETWORK OF THE INTERNET TYPE, AND A SERVER FOR CONNECTING THE DEVICES

BACKGROUND OF THE INVENTION

A computer network of the INTERNET type is well suited to the exchange of data between a computer terminal and a server called by this terminal by using the address of the server in the network.

As there are a very large number of terminals, it is impossible to allocate a definitive address to each of them, so that each is allocated an address which is provisional and variable from one call to the next, only when it makes a call, this address being communicated to the server in order to respond.

Thus, the number of addresses remains limited to the number of permanent addresses, those of the servers, and provisional addresses of the active calling equipment.

For this reason the inoperative terminals cannot be located, and thus called, since they are unknown to the network for lack of address. In particular, it is not possible to establish telephone communication directly on the INTERNET in order to transmit information such as the voice or data.

WO-98 37 665A discloses a communication process in which the user of a telephone calls the user of another device, via the telephone network, to invite him to connect to the Internet and to identify himself, in the same way as the caller, with an interconnection server which supplies each one with the Internet address of the other.

A process of this type involves both users in order to establish the initial telephone communication and then the communication via the Internet and thus constitutes a constraint especially since the person called could wish to refuse to establish some instances of telephone and Internet communication with undesirable callers and will thus be called in vain.

The present invention aims to simplify the task of users of the devices.

SUMMARY OF THE INVENTION

To this end, the invention firstly relates to a process for establishing communication on a first, computer network of the Internet type, between two devices of this first, computer network and of a second, telephone network, wherein
  one of the two calling devices calls the other on the second, telephone network to invite it into the said communication, the called device connects to the first, computer network and receives a computer address,
  the called device connects to a connection server of the first, computer network with which it registers itself at least by its computer address and an identifier known to the calling device,
  the calling device connects to the server, transmits the identifier to it and the server transmits to it the computer address of the called device, and
  the calling device, knowing the computer address of the called device, establishes the said communication,
the process being characterised in that the calling device transmits to the called device at least one identification signal of the calling device to invite it into the said communication.

Thus the called device can identify the caller and can itself decide, according to this identification, whether or not to pursue the process of establishing Internet communication. It will be noted that the calling device may be a terminal with a provisional address or a data server with a permanent address.

In one interesting embodiment of the process, the called device detects the identification signal of the calling device without responding to the incoming telephone call and the called device then calls the server. It is thus possible to avoid being charged by the telephone network.

In another interesting embodiment, the called device receives the identification signal and then responds to the telephone call and the calling device transmits thereto a request confirmation signal so that the called device calls the server.

The called party can thus distinguish conventional telephone calls from calls requesting connection to the computer network.

The invention also relates to a connection server for establishing communication on a computer network of the INTERNET type according to the process of the invention, comprising means for connection to the computer network, which are arranged to exchange computer address data and device identifiers with the devices, the connection means being connected to data processing means arranged to record computer address—identifier pairings from devices, and to provide, in response to a device consulting the server by sending an identifier of a pairing, the computer address contained in the pairing, the server being characterised in that the processing means are arranged to receive the computer address of a device consulting the server and to manage a table specifying the computer addresses of two devices which are in communication.

BRIEF DESCRIPTION OF THE DRAWING

The invention will be better understood with the aid of the following description of a preferred embodiment of the process of the invention, with reference to the single attached figure which is a schematic illustration of information transmission terminals connected to the switched telephone network, STN, and to the INTERNET, which comprises a server for connecting the terminals.

DETAILED DESCRIPTION

Figure 1:
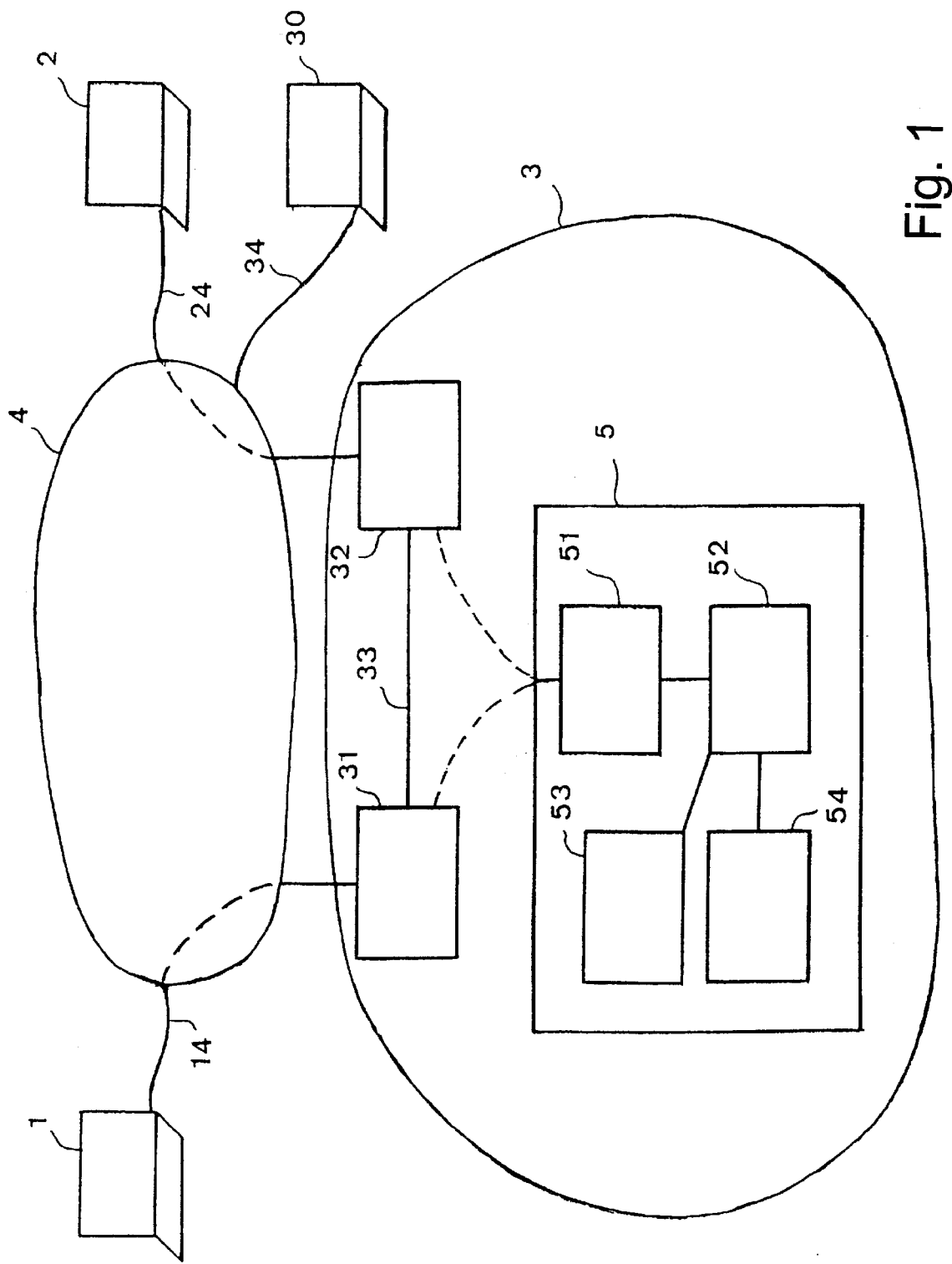

The FIGURE shows two devices, in this case terminals 1 and 2, for transmission of information, of the PC type in this example, which, in addition to the standard circuits for a data connection to the INTERNET network 3 via a telephone line 14, respectively 24, also comprise in this example a microphone and a loudspeaker and circuits permitting voice communication via the switched telephone network 4 to be established. If the network 4 were of the integrated services (ISDN) type and fully digital, the terminals 1 and 2 would themselves carry out analogue-digital conversions by means of codecs. The terminals 1, 2 can also exchange between themselves, via the INTERNET 3, packets of digitised and encoded compressed voice signals which are decompressed and decoded upon reception to be reformed at the loudspeaker or receiver.

The INTERNET 3 comprises two providers 31, 32 of INTERNET access services, also connected to the STN 4, which have been subscribed to by the users of terminals 1 and 2 respectively which can access their respective providers 31, 32 via their line 14, 24 of the STN 4. The INTERNET connection 33 connecting the two providers 31, 32 illustrates a standard temporary connection of the INTERNET 3 permitting the terminals 1 and 2 to be connected together via their lines 14 and 24. In practice, there is a plurality of such terminals. In particular a third terminal 30 of the same type is illustrated, connected by a line 34 to the STN 4.

The INTERNET 3 also comprises a server 5 for connecting terminals such as 1, 2 30 via the INTERNET 3, which provides them with the address information necessary for them to be connected.

The server 5 comprises circuits 51 for connection to the INTERNET 3, in order to exchange data with the terminals 1, 2, 30. Circuits 52 for processing the exchanged data are connected to the connection circuits 51 as well as to memory circuits 53 with modifiable-content memory, containing a table showing occupation of the terminals 1, 2, 30 and devices of the same type such as servers, and to other memory circuits 54 with modifiable-content memory such as a hard disc, containing a directory of references of devices such as the terminals such as 1, 2, 30, and of servers of the INTERNET 3. The assembly 52, 53, 54 forms a functional data processing unit. The directory 54 contains, for each of them, their telephone number N in the STN 4, their computer address number IP in the INTERNET 3 and other selection attributes such as, for example, a company name, a professional activity or even a geographical address. The occupation table 53 actually constitutes in this case a complement to the directory 54. In the directory 54 and the table 53, only the servers have a permanent address IP, whereas the terminals 1, 2, 30 have a provisional address IP only when they are in communication, ie marked as occupied in the table 53.

The software architecture of the terminal 1 in this case conforms to ITU recommendation H323, with, at the apex, a software application layer of level 7 in the OSI (Open Systems Interconnection) classification, relating, in this case, to telephony via the INTERNET 3.

The process of the invention is, however, not limited to telephony application since it relates to the establishment of communication and is independent of the data which will then be exchanged during this communication.

Below this layer, and as far as a control circuit of a modem for exchange of data on the INTERNET 3, there are two parallel channels of data processing layers, one for the signalling and the other for the useful data, in this case voice signals in the form of packets.

The process for establishing communication between the terminals 1 and 2 will now be explained.

In a general way, one of the two devices, in this case the calling terminal 1, calls the other 2 on the second, telephone network 4 to invite it into the said communication, and transmits to it an identification signal of the calling device 1, the called terminal 2 connects to the first, INTERNET computer network 3 and receives a computer address IP2, the called terminal 2 connects to the connection server 5 of the INTERNET 3 with which it registers itself at least using its computer address IP2 and an identifier N2 known to the calling terminal 1, in this case its telephone number N2 for calling via the telephone network 4, or even, for example, a code word representing this, the calling terminal 1 connects to the server 5, transmits the identifier N2 to it and the server 5 transmits to it the computer address IP2 of the called terminal 2, and the calling terminal 1, knowing the computer address IP2 of the called terminal 2, establishes the said communication via the INTERNET 3.

It will be noted that the process does not discriminate according to whether the address IP1 of the calling device 1 is provisional or permanent, it can thus be the address of a terminal or of a data server.

To this end, the server 5 comprises connection circuits 51 to exchange, with an INTERNET network 3, address data IP and identifiers of such devices, such as the telephone number N or a computer address (IP1), as explained hereinunder. The processing circuits 52 are arranged to control the registration in the table 53 of the identifier (N2) received from a terminal 2 and its computer address IP2 in order to store the computer addresses (IP1, IP2) of the terminals 1, 2 which are in communication. At least one of these will call back the server 5 to delete the two corresponding addresses IP1, IP2 once the INTERNET communication is terminated. In the same way provision can be made for the server 5 to call at least one of the terminals 1 and 2 in a cyclic manner in order to ascertain its state, free or in communication, or for the server 5 to be called in a cyclic manner by these terminals in order to confirm their state of occupation and declare them as having become free again in the case of the absence of a call for a certain period. As the table 53 forms a record of a plurality of such data, each identifier such as N2 and the associated address IP2 form a pairing in the memory, ie they are connected by a logic link or chaining which makes it possible to consult the table 53. The processing circuits 52 can then—on request from the terminal 1, for example—consult the table 53, searching therein for a specific identifier (N2), supplied by the terminal 1 as a search criterion, and, once this same identifier N2 is located in the memory 53, the associated address IP2 is also located by means of the logic link which indicates the memory position thereof in the table 53. The logic link is constituted, for example, by a memory address value Ad2 written beside the identifier N2 and indicating the position to be read in the table 53 in order to find the associated computer address IP2 therein.

In practice, each identifier N—associated address IP pairing can have a reserved memory zone with two fields of specific positions in the zone. The logic link then indicates a simple, constant shift to pass from one of the fields to the other. In such a case, this logic link is an operational constant or parameter which it will suffice to write just once in the processing circuits 52 as a shift vector. This is thus a search mode "with memory addressing by content", for which the memory zone is located by providing a part (N) of its content (N, IP), without thus supplying a memory address to search this zone.

In order to establish communication from the terminal 1, this terminal calls the terminal 2, transmitting thereto the invitation to communicate via the INTERNET, in the form of a request for connection to the server 5 comprising at least the identification signal of the calling device indicated above. The terminal 2 receives, during the incoming telephone call phase, and before occupying the line itself in order to respond, the identity of the terminal 1 using the CLIP service (caller identification), also called CLASS service. The telephone number N1 of the calling terminal 1 is transmitted via the STN 4 to the terminal 2 after the first series of ringing signals and the terminal 2 uses it, if it has an automatic mode, or it displays it on a display device so that its user is informed and can accept or reject the call. The caller identification signal N1 is thus supplied by the telephone network 4 in this case, without having to respond by "picking up" or any equivalent action for occupying the line. Then, automatically or at the command of its user and after recognising the telephone number N1 of the calling terminal 1, the terminal 2 can call the server 5 when the line 24 is released from the incoming call, by stopping the call from the terminal 1 or by "picking up" and then hanging up at the terminal 2. Provision can be made for the terminal 2 not to present to its user, in sound or in another manner, the first series of ringing signals in order to avoid him picking up too quickly, before receiving the caller identification signal.

In particular, the called terminal 2 can detect the caller identification signal N1 without occupying a line of the telephone network 4 in order to respond to the incoming telephone call, and when the line 24 becomes free again the terminal 2 calls the server 5 by this line via the provider 32 of access to the INTERNET network 3.

However, in order to be sure that the calling terminal 1 does invite communication by the INTERNET network 3, and not simply standard telephone communication via the STN 4 which it could also establish, the request for connection to the computer network 3 in this case also comprises a request confirmation signal transmitted by the terminal 1 after a response (pick-up) of the called device 2. This device occupies the line 24 in the case of an incoming call in order to receive the confirmation signal and, if successful, and after release of the line 24, the called device 2 calls the server 5 by the line 24 via the provider 32 of access to the INTERNET network 3. This request confirmation signal corresponds to actuation of a key of the terminal 1, for example, the key (a).

In the absence of the CLIP or CLASS service on the telephone network 4, this confirmation signal would itself constitute the request for connection to establish the INTERNET communication.

In this example, the called terminal 2 directs the incoming calls to an answering machine unless it has received the confirmation signal and a standard call can thus be received if the user does not respond himself.

In order to avoid any loss of time, the called terminal 2 releases its line 24 by hanging up when it recognises the confirmation signal and then calls its provider 32 to connect to the server 5. In this case, before hanging up the called terminal 2 transmits in return, on the line 24, a signal to acknowledge receipt of the confirmation signal to inform the terminal 1 of the success of its call.

In a semi-automatic mode of operation, the called terminal 2, comprising operator-machine interface means such as a bell or a light and a keyboard, signals the arrival of the INTERNET communication request to its user and establishes the connection to the INTERNET network 3 only in the case of a response from the user. The user can thus refuse to establish communication via the INTERNET 3 or accept it by operating a key or pointing with a mouse to an icon on the screen of the terminal 2.

Alternatively, in an entirely automatic embodiment the terminals 1 and 2 simply signal to their respective users that the communication with the remote terminal 2, 1 has been established automatically via the INTERNET network 3 and that they can thus pick up their telephone handset of the terminal 1, 2 in order to speak. The same principle applies to exchange data, for example faxes.

It will be noted that in another example, provision could be made for the terminal 2 to establish communications systematically on the INTERNET 3, ie that the STN 4 would then serve only to transmit the requests for communication on the INTERNET 3. In such a case the terminal 2 would consider any incoming call from the STN 4 as such a request, thus without using the CLIP service or seeking a specific request signal or request confirmation. The CLIP service and/or this signal would simply avoid futile INTERNET communication attempts by the terminal 2 in the case of a telephone call arriving at the terminal in error.

The choice of a correspondent to call can be facilitated when the server 5 comprises, as in this case, for a plurality of such information transmission devices such as 1, 2, the directory 54 based on telephone numbers N which are associated with attributes characterising the device concerned, terminal or server, the directory 54 being accessible for writing and reading by the INTERNET network 3. The calling terminal 1 supplies the server 5 with the telephone number N2 of the called terminal 2 and the server 5 then complements the directory 54 using the table 53 showing occupation of the devices, with their addresses IP and the associated state of occupation.

The communication between the terminals 1 and 2 can be established directly (33) between the access provider 32 of the called terminal 2 and the access provider 31 of the calling terminal (or data server) 1. Alternatively the communication between the two devices 1, 2 could be established via the server 5. In particular, if one of the terminals 1, 2 does not have an information exchange protocol compatible with that of the other terminal 2, 1 with which communication is to be established via the INTERNET 3, the server 5 is used as a converter for the information exchange protocol between the devices 1, 2 once communication is established.

In order to establish communication it is also possible to use the server 5 as an access gateway to the INTERNET computer network 3 from the information transmission terminal 30, if this is incompatible with the INTERNET protocol and/or has no access service provider. In such a case, the server 5 then being connected to the STN 4 by a connection, not shown, a terminal 30, which would be purely telephonic, could thus connect to the INTERNET 3 for any desired communication and also have management functions in the server 5 for the exchanged data and information in order to adapt to the INTERNET 3 using data processing circuits (for example, integrated into the circuits 52) of the server 5 of the same type as those provided in any terminal compatible with the INTERNET 3 in order, in particular, to exchange the packets of data and to manage the user-machine interface elements, keyboard, screen. The server 5 is then in this respect equivalent to one or a plurality of terminals 1 or 2 of which the telephone part, or part for transmission of useful data such as facsimile, would be diverted via the STN 4.

In order to facilitate consultation of the directory 54, provision is made in this case to be able to copy it, at least partially, in the terminals 1 and 2. Terminal 1, for example, comprises random access memories, which are thus writeable, modifiable and able to be connected to the INTERNET network 3, and it calls the server 5, transmitting thereto selection criteria for attributes in the directory 54 (and the table 53) then it stores the selected telephone numbers N and the associated attributes which are supplied in response by the server 5. The attributes comprise the state of occupation of the devices such as 1, 2 and of the data servers and, if required, their address IP1, IP2 in the computer network 4.

In order to establish the desired INTERNET communication with the terminal 2, and as the calling terminal 1 does not, in this example, have a permanent address IP 1, this calling terminal can alternatively call, via the telephone network 4, the service provider 31 of access to the INTER- NET network 3 in order thus to procure a provisional address IP1, then it orders, automatically or under the control of its user, a double call on the telephone network 4 to call the terminal 2. When the latter responds, the terminal 1 transmits to it the provisional address IP1 and it then orders toggling back to the service provider 31 to call the server 5. Thus the terminal 2 can in this case provide the server 5 with this address IP1 (in addition to IP2) as an identifier of terminal 1, thus known to the latter, in order for the terminal 1 then to interrogate the server 5 by means of the address IP1 and thus finds in the table 53 the address IP2 forming a pairing with the address IP1 which serves as an identifier.

In all the cases above, once the two terminals 1, 2 are in communication they establish a dialogue between them by exchanging signals according to CCITT recommendation Q931 for establishment of a logic link for transmission of information, specifying the software version of the communication protocol used, the size of the blocks of data exchanged, the type of encoding, the value of the time delays associated with the transmissions, etc. Voice communication can then be established since, as the two terminals 1, 2 are provided for voice-type information, the voice is transmitted in the form of packets of data. In this example a connected-mode transfer service TCP is used in each terminal 1, 2 to assure that the packets received are reconverted, after reception, into a voice signal in the order of their transmission by the terminal 1, 2 which has transmitted them.

The case of a conference between three or more parties will now be explained and, in particular, in the case of a device (30) which is incompatible with the INTERNET 3 and/or the terminals 1, 2.

If the third terminal 30 wishes to call the terminal 2, for example, it can do so via the STN 4 but cannot connect to it if it is already in communication via the INTERNET 3. In such a case the third terminal 30 calls the server 5, transmitting to it the telephone number N2 of the terminal 2, the server 5 consults the table 53 of established communications and, finding the terminal 2 therein with its address IP2, transmits to the address IP2 of the terminal 2, via the INTERNET 3, a request for connection to the third terminal 30. This request is a packet of signal data which is inserted in the flow of packets received by the terminal 2 from the terminal 1. Operationally, this replaces, on the INTERNET 3, the CLIP or CLASS service of the STN 4.

In this case the server 5 establishes the connection between the third terminal 30 and the terminal 2 which it has called only after reception of an acceptance message from the latter. The terminal 2 thus has two correspondents, of which it can add voice signals. It can also direct the flow of packets of useful data from the terminal 30 to a facsimile circuit or any other data processing circuit compatible with the terminal 30.

The server 5 can thus, in addition to its connection or associating function, ie function of informing terminals 1, 2 so that they establish INTERNET communication, have the functions of an access provider for the INTERNET 3 of a logic interface to connect and adapt to the INTERNET an equivalent terminal or device for transmission of information, which is incompatible therewith, of an adaptation logic interface of one terminal to the data transmission protocol of another, and of a switch to connect two or more terminals together, possibly with the adaptations above.

What is claimed is:

1. In a process for establishing communication on a first, computer network of the Internet type between devices of this first, computer network and of a second, telephone network, wherein one of the two calling devices calls the other on the second, telephone network to invite it into the said communication, the called device connects to the first, computer network and receives a computer address, and wherein the called device connects to a connection server of the first, computer network with which it registers itself at least by its computer address and an identifier known to the calling device, and the calling device connects to the server, transmits the identifier to it and the server transmits to it the computer address of the called device, and the calling device, knowing the computer address of the called device, establishes the said communication, and the calling device transmits to the called device at least one identification signal of the calling device to invite it into the said communication, a connection server for establishing communication on a computer network of the INTERNET type according to the process, the server comprising means for connection to the computer network, which is arranged to exchange, with the devices, computer address data and identifiers of the devices the means arranged for connection being connected to data processing means arranged to record computer address—identifier pairings from devices, and to provide, in response to a device consulting the server by sending an identifier of a pairing, the computer address being contained in the pairing, wherein the processing means are arranged to receive the computer address of a device consulting the server and to manage a table specifying the computer addresses of two devices which are in communication.

2. Server according to claim 1, wherein the processing means are arranged to receive, from the devices, data relating to the end of communication and to delete the table accordingly.

3. Server according to claim 1, wherein a directory is provided of telephone numbers of a plurality of devices associated with attributes for selecting devices.

4. Server according to claim 1, wherein the data processing means are arranged to connect and adapt to the computer network, information transmission devices which are incompatible therewith.

* * * * *

UNITED STATES PATENT AND TRADEMARK OFFICE
CERTIFICATE OF CORRECTION

PATENT NO. : 6,754,708 B1
DATED : March 2, 2004
INVENTOR(S) : Pierre Sabatier et al.

It is certified that error appears in the above-identified patent and that said Letters Patent is hereby corrected as shown below:

Column 8,
Line 12, "between devices" should be -- between two devices --.
Line 34, "means arranged for" should be -- means for --.

Signed and Sealed this

Eleventh Day of January, 2005

JON W. DUDAS
*Director of the United States Patent and Trademark Office*